United States Patent
Wang et al.

(10) Patent No.: US 11,182,425 B2
(45) Date of Patent: Nov. 23, 2021

(54) AUDIO PROCESSING METHOD, SERVER, USER EQUIPMENT, AND SYSTEM

(71) Applicant: TENCENT TECHNOLOGY (SHENZHEN) COMPANY LIMITED, Shenzhen (CN)

(72) Inventors: Weiguang Wang, Shenzhen (CN); Zhiwei Zhuang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 213 days.

(21) Appl. No.: 15/975,547

(22) Filed: May 9, 2018

(65) Prior Publication Data

US 2018/0260478 A1 Sep. 13, 2018

Related U.S. Application Data

(63) Continuation of application No. PCT/CN2017/072592, filed on Jan. 25, 2017.

(30) Foreign Application Priority Data

Jan. 29, 2016 (CN) .......................... 201610067813.1

(51) Int. Cl.
*G06F 17/00* (2019.01)
*G06F 16/683* (2019.01)
(Continued)

(52) U.S. Cl.
CPC .......... *G06F 16/683* (2019.01); *A63F 13/355* (2014.09); *A63F 13/358* (2014.09);
(Continued)

(58) Field of Classification Search
CPC .... G06F 16/683; G06F 16/1734; G06F 3/165; A63F 13/355; A63F 13/358; A63F 13/54
See application file for complete search history.

(56) References Cited

U.S. PATENT DOCUMENTS 6,106,399 A * 8/2000 Baker ..................... A63F 13/12
463/42
7,386,356 B2 * 6/2008 Fay ...................... G10H 1/0041
700/94
(Continued)

FOREIGN PATENT DOCUMENTS

CN 102355504 2/2012
CN 103067129 4/2013
(Continued)

OTHER PUBLICATIONS

International Search Report dated May 3, 2017 in PCT/CN2017/072592 filed Jan. 25, 2017. (With English Translation).
(Continued)

*Primary Examiner* — Hasanul Mobin
(74) *Attorney, Agent, or Firm* — Oblon, McClelland, Maier & Neustadt, L.L.P.

(57) ABSTRACT

Embodiments of the present disclosure disclose an audio processing method, applied to a cloud interactive system, where the cloud interactive system includes user equipment and a server. The method includes detecting, by a server device that interacts with user equipment in an interactive system, a calling to an audio interface from an interactive application, generating according to a type of the audio interface, an audio instruction corresponding to the type when the calling is detected determining whether a record that audio data corresponding to the audio instruction is sent to user equipment in the interactive system exists, and sending, by the server device, the audio instruction to the user equipment when the record exists. In response to the audio instruction, the user equipment executes the audio instruction using cached audio data.

15 Claims, 7 Drawing Sheets

(51) Int. Cl.
*G06F 16/17* (2019.01)
*G06F 3/16* (2006.01)
*A63F 13/355* (2014.01)
*A63F 13/54* (2014.01)
*A63F 13/358* (2014.01)

(52) U.S. Cl.
CPC ............. *A63F 13/54* (2014.09); *G06F 3/165* (2013.01); *G06F 16/1734* (2019.01)

(56) References Cited

U.S. PATENT DOCUMENTS

| | | | | |
|---|---|---|---|---|
| 7,822,610 | B2* | 10/2010 | Burns | G06F 3/167 704/270.1 |
| 7,865,257 | B2* | 1/2011 | Fay | H04S 1/007 700/94 |
| 8,463,612 | B1* | 6/2013 | Neath | H04L 65/1083 370/352 |
| 9,596,539 | B1* | 3/2017 | Calisi | H04K 3/825 |
| 2002/0143547 | A1* | 10/2002 | Fay | G10H 7/002 704/270 |
| 2004/0157664 | A1* | 8/2004 | Link | A63F 13/52 463/43 |
| 2005/0043090 | A1* | 2/2005 | Pryzby | G07F 17/3202 463/35 |
| 2009/0161853 | A1* | 6/2009 | Ku | H04L 65/1016 379/207.16 |
| 2011/0054647 | A1* | 3/2011 | Chipchase | H04M 3/53366 700/94 |
| 2012/0110429 | A1* | 5/2012 | Tzonis | G06Q 10/10 715/230 |
| 2013/0170662 | A1* | 7/2013 | Koga | G10K 11/1752 381/73.1 |
| 2013/0178294 | A1* | 7/2013 | Wang | A63F 13/02 463/38 |
| 2013/0212176 | A1* | 8/2013 | Koulomzin | G06Q 50/01 709/204 |
| 2014/0219461 | A1* | 8/2014 | Liu | G10L 19/02 381/56 |
| 2014/0310374 | A1 | 10/2014 | Lee et al. | |
| 2014/0325354 | A1* | 10/2014 | Zhang | G06F 3/0488 715/716 |
| 2015/0221316 | A1* | 8/2015 | Mufti | G06F 16/683 700/94 |
| 2015/0350232 | A1* | 12/2015 | Liu | H04L 63/1433 726/23 |
| 2016/0023109 | A1* | 1/2016 | Colenbrander | A63F 13/355 463/42 |
| 2016/0277903 | A1* | 9/2016 | Poosala | G06F 3/04842 |

FOREIGN PATENT DOCUMENTS

| | | |
|---|---|---|
| CN | 104025521 | 9/2014 |
| CN | 105786441 | 7/2016 |
| WO | 2015/018229 | 2/2015 |
| WO | 2016/014603 | 1/2016 |

OTHER PUBLICATIONS

European Search Report dated Jul. 5, 2019 in Application No. 17743745.6, (7 pages).

* cited by examiner

FIG. 11

AUDIO PROCESSING METHOD, SERVER, USER EQUIPMENT, AND SYSTEM

RELATED APPLICATION

This application is a continuation of International Application No. PCT/CN2017/072592, filed on Jan. 25, 2017, which claims priority to Chinese Patent Application No. 201610067813.1, entitled "AUDIO PROCESSING METHOD, SERVER, USER EQUIPMENT, AND SYSTEM" filed with the Chinese Patent Office on Jan. 29, 2016. The entire disclosures of the prior applications are hereby incorporated by reference in their entirety.

FIELD OF THE TECHNOLOGY

The present disclosure relates to the field of cloud technology, and in particular, to an audio processing method, a server, a user equipment, and a system.

BACKGROUND OF THE DISCLOSURE

With the rapid development of network bandwidth in recent years, a cloud interactive system is generated because of an increasingly mature cloud computing technology. A current cloud interactive system usually includes a server and multiple user equipment. The server may be a cluster server. Multiple interactive applications may be executed in the cloud interactive system. The cloud interactive system includes an application related to audio processing. In the related technology, the server usually plays an audio in the interactive applications and obtains a clip of the played audio in real time according to certain frequency. The clip is sent to the user equipment, so that the user equipment may implement playing the audio at a server end.

In the related technology, an audio processing solution from the server to the user equipment is that the server obtains a clip of audio data from the server in real time according to certain frequency. During transmission, network fluctuation has a great effect on the audio clip, leading to audio freeze. In addition, during network transmission of the audio data, if the network is delayed, the user equipment cannot receive a new clip of the audio data when the previous clip of the audio data finishes playing. Therefore, no audio data is played in an interval of playing the two clips of the audio data, further leading to audio freeze. Moreover, the server needs to continuously obtain audio clips. Some audio clips may be same, but are sent repeatedly, causing large network traffic from the server to the user equipment. Further, when the server repeatedly plays a cycled background music, especially when music is mixed, the server cannot extract each music component, causing bad playing quality of an audio of the user equipment.

SUMMARY

An audio processing method provided in the embodiments of the present disclosure may improve the playing quality of an audio at a user equipment end and reduce network traffic from the server to the user equipment. The embodiments of the present disclosure further provide a corresponding server, user equipment, and a system.

Aspects of the disclosure provide a method for audio processing. The method includes detecting, by a server device that interacts with user equipment in an interactive system, a function call to an audio interface from an interactive application, generating according to a type of the audio interface, an audio instruction corresponding to the type when the function call is detected, determining whether a record that audio data corresponding to the audio instruction has been sent to user equipment in the interactive system exists, and sending, by the server device, the audio instruction to the user equipment when the record exists. In response to the audio instruction, the user equipment executes the audio instruction using cached audio data.

In some embodiments, the method includes calling (e.g., extracting, via a function call to the audio interface) the audio data corresponding to the audio instruction when the record does not exist, and sending the audio data and the audio instruction to the user equipment. Further, the method includes adding, in a data sending record, the record that the audio data corresponding to the audio instruction has been sent.

In some embodiments, to detect the function call to the audio interface from the interactive application, the method includes using a Hook function to monitor functions calls to the audio interface, and detecting the function call to the audio interface from the interactive application when a calling instruction of the interactive application to the audio interface is detected by the Hook function.

Aspects of the disclosure provide a method for audio processing. The method includes receiving, by user equipment that interacts with a server device in an interactive system, an audio instruction sent by the server device, accessing a cache to obtain audio data corresponding to the audio instruction, and executing the audio instruction to generate audio signals based on the cached audio data.

In some embodiments, before receiving the audio instruction sent by the server device, the method includes receiving the audio data corresponding to the audio instruction that is sent by the server device, and storing, by the user equipment, the audio data corresponding to the audio instruction in the cache.

According to an aspect of the disclosure, the method includes receiving the audio data with a header that identifies the audio data. In some embodiments, the method includes receiving the audio data with the header that is indicative of an audio file to which the audio data belongs and a position of the audio data in the audio file. In an example, the method includes receiving the audio data with the header that includes a key value for identifying the audio file to which the audio data belongs, an offset position of the audio data in the audio file and a length of the audio data.

Further, the method includes determining, by the user equipment, the audio file according to the key value, determining, by the user equipment, a storage position of the audio data according to the offset position and the length, and caching the audio data according to the storage position.

Aspects of the disclosure provide an apparatus that includes interface circuitry, storage circuitry and processing circuitry. The interface circuitry is configured to receive an audio instruction that is sent by a server device. The storage circuitry is configured to cache audio data associated with the audio instruction. The processing circuitry is configured to access the storage circuitry to obtain the audio data associated with the audio instruction and execute the audio instruction to generate audio signals based on the cached audio data.

In the related technology, every time user equipment plays an audio clip that is requested from a server end, the server sends audio data of the audio clip to the user equipment for playing. Compared with that, the embodiments of the present disclosure provide an audio processing method. The server sends an audio instruction to the user equipment to implement playing the audio at the server end by the user equipment, so as to improve the playing quality of an audio at a user equipment end. In addition, the server merely sends the audio instruction to the user equipment when the server determines that audio data corresponding to the audio instruction to be sent has a sending record sent to a corresponding user equipment without repeatedly sending the audio data, reducing network traffic from the server to the user equipment.

BRIEF DESCRIPTION OF THE DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person skilled in the art may still derive other drawings from these accompanying drawings.

DESCRIPTION OF EMBODIMENTS

An audio processing method provided in the embodiments of the present disclosure may improve the playing quality of an audio at a user equipment end and reduce network traffic from the server to the user equipment. The embodiments of the present disclosure further provide a corresponding server, a user equipment, and a system. Detailed descriptions are made below separately.

The following describes the technical solutions in the embodiments of the present disclosure with reference to the accompanying drawings in the embodiments of the present disclosure. The described embodiments are merely some but not all of the embodiments of the present disclosure. All other embodiments obtained by a person skilled in the art based on the embodiments of the present disclosure without creative efforts shall fall within the protection scope of the present disclosure.

Figure 1:
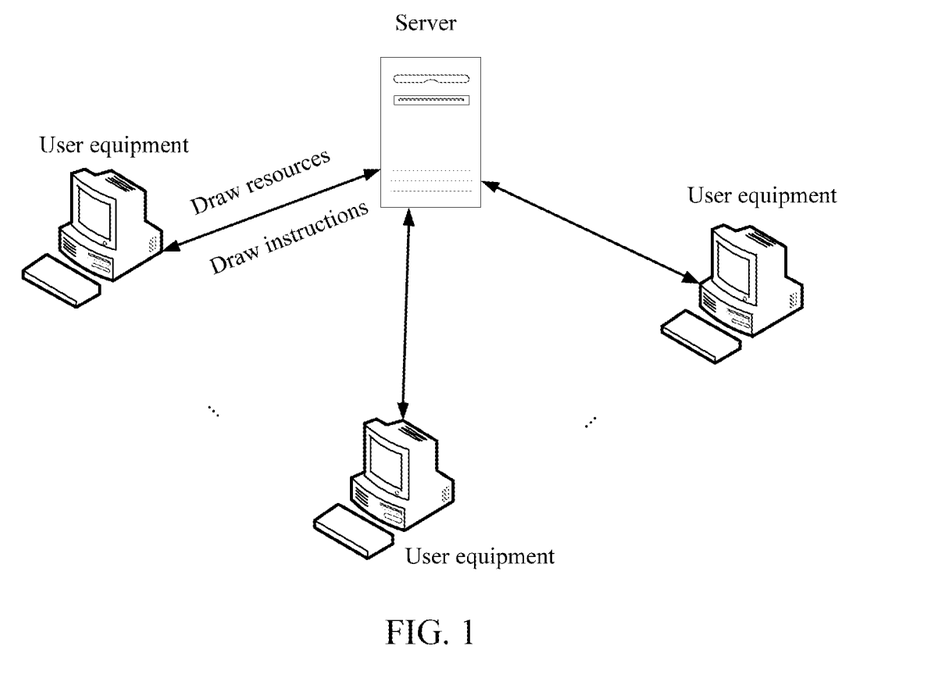
FIG. 1 is a schematic diagram of an embodiment of a cloud interactive system according to an embodiment of the present disclosure.

FIG. 1 is a schematic diagram of an embodiment of a cloud interactive system according to an embodiment of the present disclosure.

Referring to FIG. 1, the cloud interactive system may be understood as a cloud game system, usually including a server and a user equipment, where multiple user equipment may be included and the server may further be a server cluster.

The user equipment may be terminal devices such as a personal computer (PC), a laptop, and a smartphone. The server may be specific game server. Currently, an audio processing solution of a game is to obtain an audio clip being played at a server end by the server and transmit the audio clip to a user equipment end to play, causing bad playing quality of an audio at the user equipment end and leading to large consumption of network traffic from the server to the user equipment.

In the embodiments of the present disclosure, the server indicates to play audio data at the user equipment end by using an audio instruction, so as to improve the playing quality of the audio at the user equipment end. In addition, the server merely sends the audio instruction when the audio data is sent to the user equipment previously. In some embodiments, the server uses a sending record to keep track of audio data that is sent to the user equipment previously. The user equipment may use cached audio data to implement an audio operation when executing the audio instruction, so as to reduce the network traffic from the server to the user equipment.

The embodiments of the present disclosure relate to Hook function, that is, hook injection, which replaces an original function executing process with a self-defining function.

Figure 2:
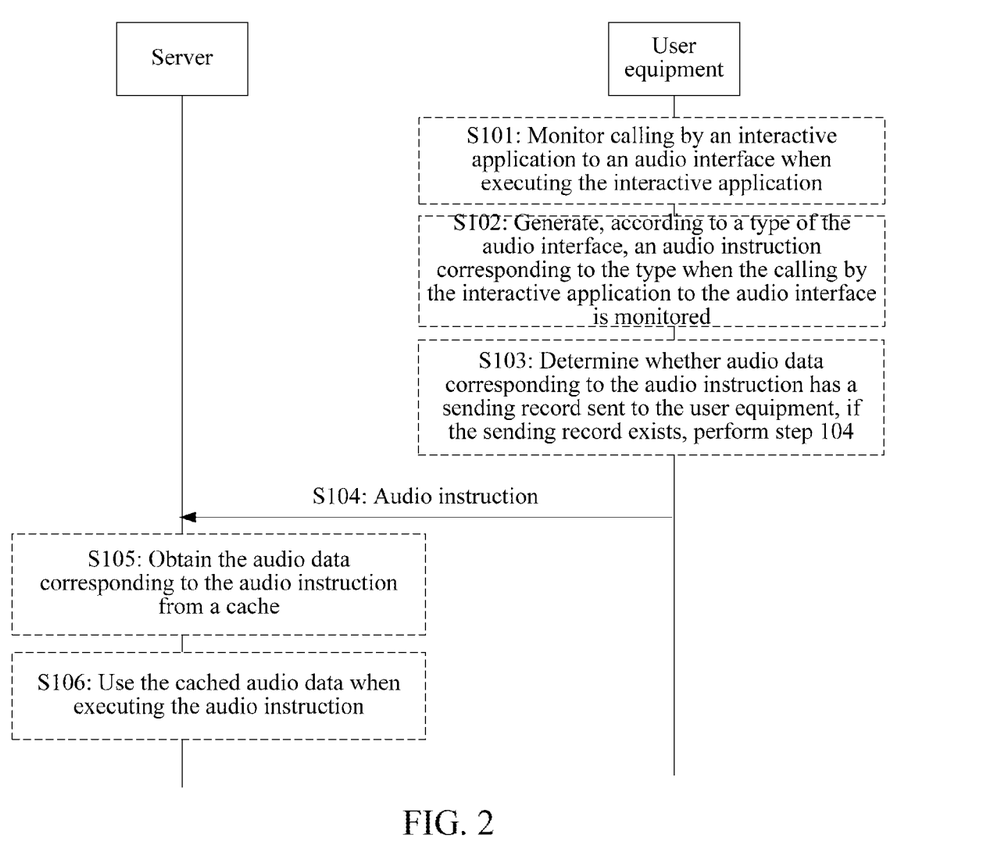
FIG. 2 is a schematic diagram of an embodiment of an audio processing method according to an embodiment of the present disclosure.

With reference to the cloud interactive system shown in FIG. 1, an audio processing process provided in the embodiments of the present disclosure is described referring to a schematic diagram of an audio processing method shown in FIG. 2.

Referring to FIG. 2, an embodiment of the audio processing method provided in an embodiment of the present disclosure includes:

S101: Detect, by the server that interacts with user equipment in an interactive system, a function call to an audio interface from an interactive application.

With reference to a game scene, the step is to monitor or detect, by the server, calling by a game to an audio interface of an audio software development kit (SDK) when executing the game.

The step may be: Monitor, by the server, the calling by the interactive application to the audio interface by using Hook function of the audio interface; and determine the calling by the interactive application to the audio interface if a calling instruction of the interactive application to the audio interface is monitored to enter the Hook function of the audio interface.

S102: Generate, by the server according to a type of the audio interface, an audio instruction corresponding to the type when the calling (the function call) by the interactive application to the audio interface is monitored/detected.

There are multiple types of the audio interface, for example, a creating audio, a playing audio, a mixed audio, and a pausing audio.

A corresponding audio instruction generated according to the type of the audio interface has a corresponding function, for example, creating an audio, playing an audio, mixing an audio, and pausing an audio, etc.

In fact, not all audio instructions need audio data. For example, an audio instruction of pausing audio does not need audio data. For an audio instruction that does not need audio data, the server may first determine that the audio data is not needed according to the type of the audio interface and directly send the audio instruction that does not need the audio data to the user equipment.

The audio instruction occupies little network traffic, so that a processing solution of an audio instruction that needs audio data is particularly illustrated in the embodiments of the present disclosure. However, the protection scope of the present disclosure is not limited.

S103: Determine, by the server, whether a record that audio data corresponding to the audio instruction has been sent to the user equipment exists.

The server may correspondingly record the audio data sent to the user equipment, so as to avoid repeatedly sending.

S104: Send, by the server, the audio instruction to the user equipment if the record exists.

When the sending record of the audio data corresponding to the audio instruction exists in the server, the server merely needs to send the audio instruction to reduce network traffic.

S105: Obtain, by the user equipment, the audio data corresponding to the audio instruction from a cache after receiving the audio instruction sent by the server.

S106: Use, by the user equipment, the cached audio data to perform a corresponding audio operation when executing the audio instruction.

In the related technology, a user equipment needs to play an audio clip sent by a server to implement playing an audio at a server end by the user equipment. Compared with that, the embodiments of the present disclosure provide an audio processing method. The server sends an audio instruction to the user equipment to implement playing the audio at the server end by the user equipment, so as to improve the playing quality of an audio at a user equipment end. In addition, the server merely sends the audio instruction to the user equipment when the server determines that audio data corresponding to the audio instruction to be sent has a sending record sent to a corresponding user equipment without repeatedly sending the audio data, reducing network traffic from the server to the user equipment.

Figure 3:
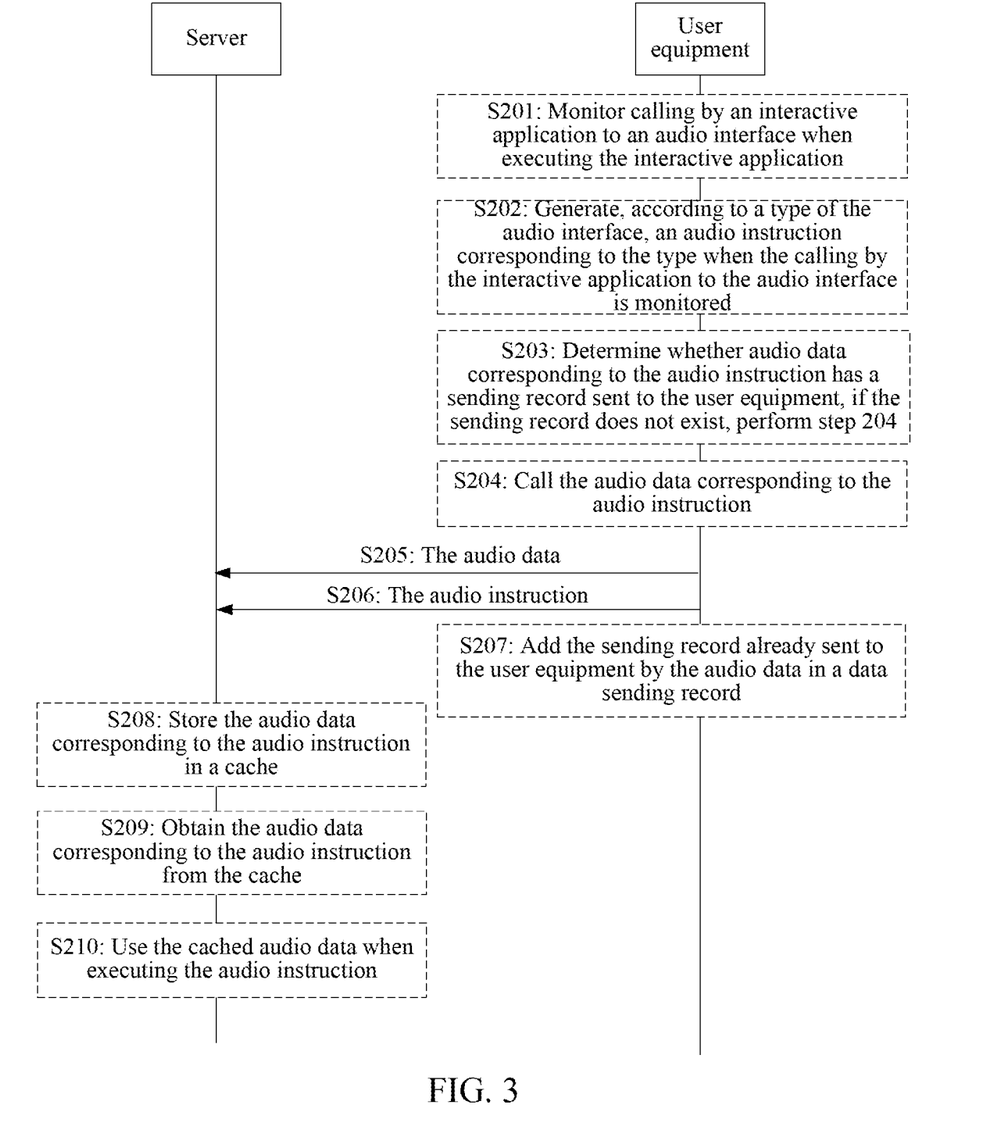
FIG. 3 is a schematic diagram of another embodiment of an audio processing method according to an embodiment of the present disclosure.

Referring to FIG. 3, another embodiment of the audio processing method provided in an embodiment of the present disclosure includes:

S201 to S203 are the same with S101 to S103 in part of the embodiment in FIG. 2. S201 to 203 may be understood with reference to S101 to S103 in part of the embodiment in FIG. 2, which is not described herein.

S204: Call, by the server, the audio data corresponding to the audio instruction if the sending record does not exist. The audio data may be audio data in a compressed state.

The step may be: Read, by the server, the Hook function by using a magnetic disk to call the audio data in the compressed state corresponding to the audio instruction; and call the audio data in the compressed state corresponding to the audio instruction if a calling instruction of the interactive application to read the magnetic disk is monitored to enter the magnetic disk to read the Hook function.

The server directly calls the audio data in the compressed state in the magnetic disk and does not need to compress an audio clip like the related technology, so as to reduce occupation of a processor in the server.

S205: Send, by the server, the audio data to the user equipment.

S206: Send, by the server, the audio instruction to the user equipment.

S207: Add, by the server, the sending record already sent to the user equipment by the audio data in a data sending record.

S208: Store, by the server, the audio data corresponding to the audio instruction in a cache after the user equipment receives the audio data corresponding to the audio instruction sent by the server. The audio data may be audio data in a compressed state.

In some embodiments, the audio data to play is a portion of an audio file. In an implementation, a data head (header) of the audio data includes a key value of an associated audio file of the audio data and an offset position and an offset length of the audio data in the audio file.

The storing the audio data corresponding to the audio instruction in the cache includes:

determining, by the user equipment, the associated audio file according to the key value of the audio file;

determining, by the user equipment, a storage position of the audio data in the associated audio file according to the offset position and the offset length; and caching, by the user equipment, the audio data in the associated audio file according to the storage position.

S209 and S210 are the same with S105 and S106 in an embodiment corresponding to FIG. 2. S209 and S210 may be understood with reference to S105 and S106, which is not described herein.

Figure 4:
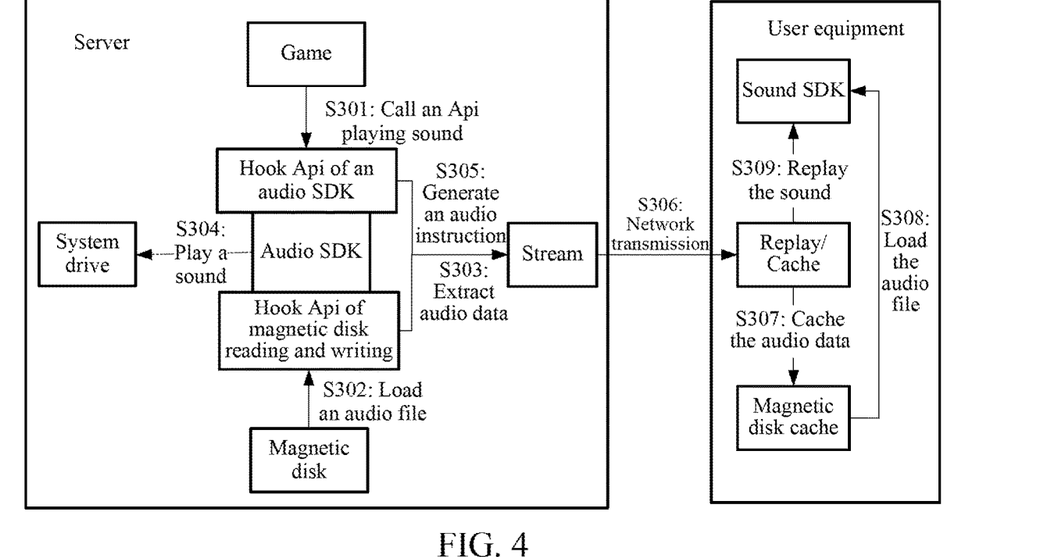
FIG. 4 is a schematic diagram of another embodiment of an audio processing method according to an embodiment of the present disclosure.

Referring to FIG. 4, the following further describes the audio processing method in the embodiments of the present disclosure with reference to a game scene.

As shown in FIG. 4, in view of software and hardware, the server may include several parts such as a system drive, a game, an audio software development kit (SDK), a magnetic disk, a Hook application programming interface (Api) of the audio SDK, and a Hook Api of magnetic disk reading and writing.

S301: Hook Api of audio SDK used in a game.

S302: Hook Api of magnetic disk reading and writing related to an audio in the audio SDK used in the game and monitor loading of an audio file.

S303: Stream audio data to send to a user equipment after extracting the audio data.

S304: Play a sound by using a system drive.

S305: Generate an audio instruction and stream the audio instruction to send to the user equipment.

S306: Transmit, by network, the audio data and the audio instruction to the user equipment.

S307: Cache, by the user equipment, the audio data in magnetic disk cache after receiving the audio data.

S308: Load, by the user equipment, the audio data from the magnetic disk cache after receiving the audio instruction.

S309: Execute the audio instruction and replay the sound.

In the embodiments of the present disclosure, a server end relates to streaming of the audio data and the audio instruction. A streaming process may be understood by referring to FIG. 5.

Figure 5:
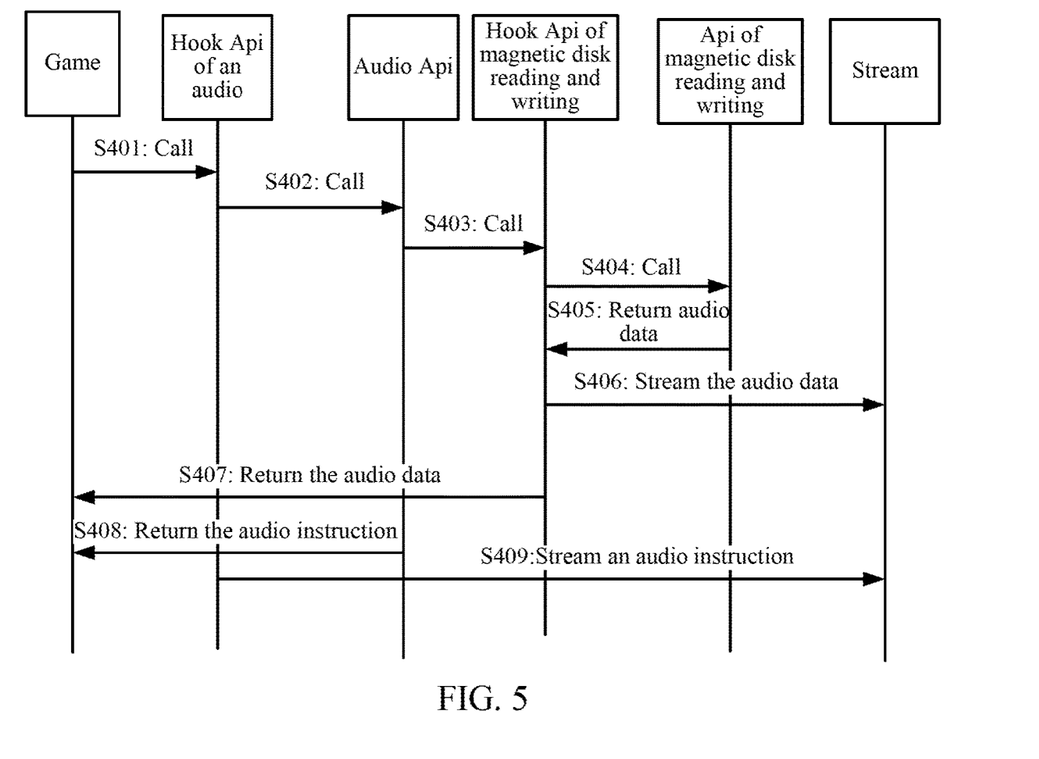
FIG. 5 is a schematic diagram of another embodiment of an audio processing method according to an embodiment of the present disclosure.

S401: Enter, by the game, Hook function of audio Api of this solution first when calling the Api of the audio SDK.

S402: Call the Api of the audio SDK first in the Hook function of the audio Api.

S403: Reenter Hook function of the magnetic disk reading if a current calling of the audio Api leads an interactive application to read a file on the magnetic disk.

S404: Call the Api of the magnetic disk reading and writing in the Hook function of the magnetic disk reading.

S405: Return the Api of the magnetic disk reading and writing to the audio data.

S406: Stream the audio data to the user equipment.

S407: Return, by the Hook function of the magnetic disk reading, the audio data to the game.

S408: Return, by the audio Api, the audio instruction to the game.

In this case, the sound may be played in the game according to the audio data and the audio instruction.

S409: Stream, by the Hook function of the audio Api, the audio instruction to the user equipment.

In this application, whether data read by the audio SDK is new may be monitored. If the data is new, the audio data is streamed to a retrace end and the audio data uses a file name as a key value. Reading information, such as an offset and the length, of the audio data is updated. If the audio data is streamed before, the audio data is no longer streamed. Network traffic may be reduced.

At the server end, when the audio data is streamed, key is used as the file name and the offset and length in an original file are used as a data head. In this case, at a user equipment end, data may be correctly written into a correct file and a correct position.

As shown in FIG. 5, for example, the audio data needed by the audio instruction may be streamed to the user equipment before the audio instruction. Therefore, when the audio instruction is replayed at the user equipment end, needed audio data is cached on the magnetic disk.

Data cached by the user equipment in this solution, for example, is the same with data used by the game at the server end, as well as a file code and the audio SDK. Therefore, once a piece of audio data is played for one time at the user equipment end and is cached, the server end no longer needs to stream same music if hit by the cached data when an audio engine based on events used in the game mixes different music and triggers repeatedly played music.

In this application, original audio data cached on the magnetic disk and used in the game is cached. The data may be compressed. Therefore, when being streamed, data read from the magnetic disk does not need to be compressed to stream, so as to reduce occupation of a processor in the server.

Apart from the cloud game system, the present disclosure may further be applied in a remote program desktop system, so as to reduce CPU occupation of the remote system and network traffic when playing streaming media.

Figure 6:
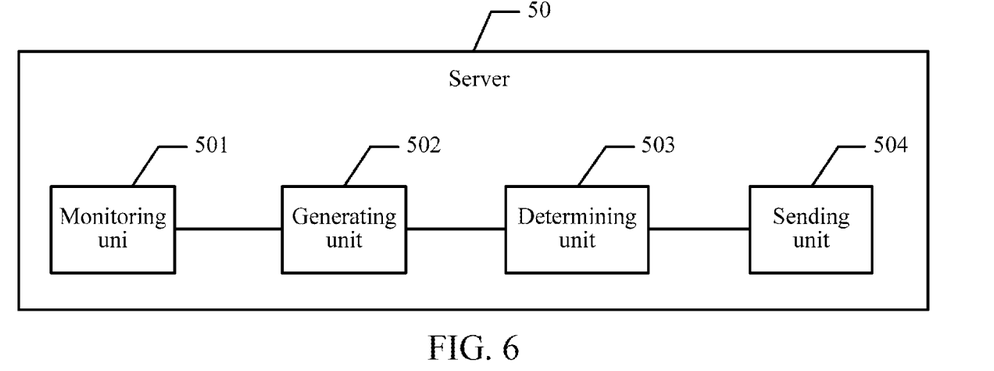
FIG. 6 is a schematic diagram of an embodiment of a server according to an embodiment of the present disclosure.

Referring to FIG. 6, the server 50 provided in the embodiments of the present disclosure is applied to a cloud interactive system. The cloud interactive system includes a user equipment. An embodiment of the server includes:

a monitoring unit 501, configured to monitor calling by an interactive application to an audio interface when executing the interactive application;

a generating unit 502, configured to generate, according to a type of the audio interface, an audio instruction corresponding to the type when the calling by the interactive application to the audio interface is monitored;

a determining unit 503, configured to determine whether audio data corresponding to the audio instruction generated by the generating unit 502 has a sending record sent to the user equipment; and a sending unit 504, configured to send the audio instruction to the user equipment when the determining unit 503 determines that the sending record exists, the audio instruction being configured to use cached audio data when the user equipment executes the audio instruction.

In the related technology, a user equipment needs to play an audio clip sent by a server to implement playing an audio at a server end by the user equipment. Compared with that, the embodiments of the present disclosure provide a server. The server sends an audio instruction to the user equipment to implement playing the audio at the server end by the user equipment, so as to improve the playing quality of an audio at a user equipment end. In addition, the server merely sends the audio instruction to the user equipment when the server determines that audio data corresponding to the audio instruction to be sent has a sending record sent to a corresponding user equipment without repeatedly sending the audio data, reducing network traffic from the server to the user equipment.

Figure 7:
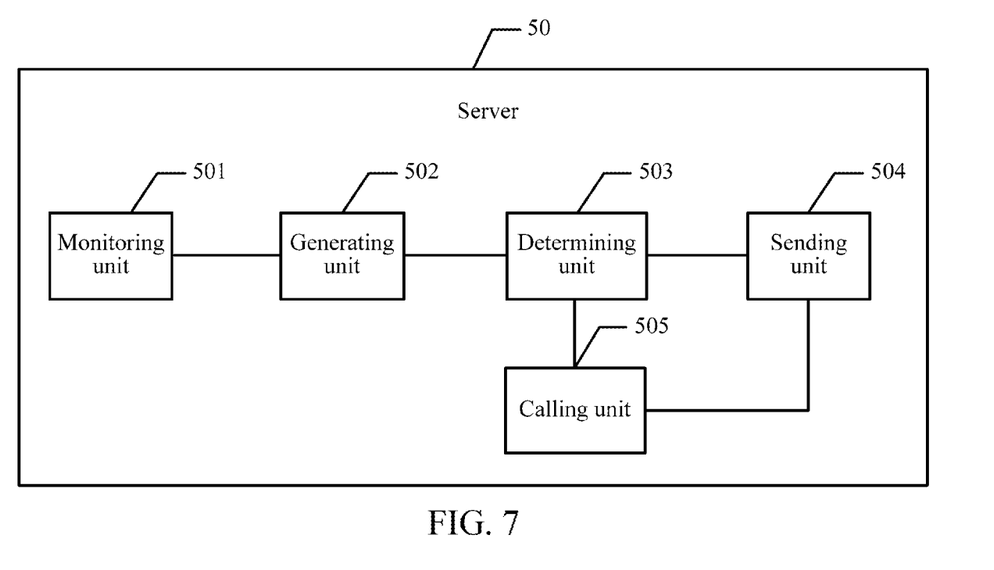
FIG. 7 is a schematic diagram of another embodiment of a server according to an embodiment of the present disclosure.

Optionally, based on the embodiment corresponding to FIG. 6, referring to FIG. 7, in a first optional embodiment of the server provided in the embodiments of the present disclosure, the server further includes a calling unit 505.

The calling unit 505 is configured to call the audio data corresponding to the audio instruction when the determining unit 503 determines that the sending record does not exist.

The sending unit 504 is further configured to sequentially send the audio data and the audio instruction that are called by the calling unit 505 to the user equipment.

Figure 8:
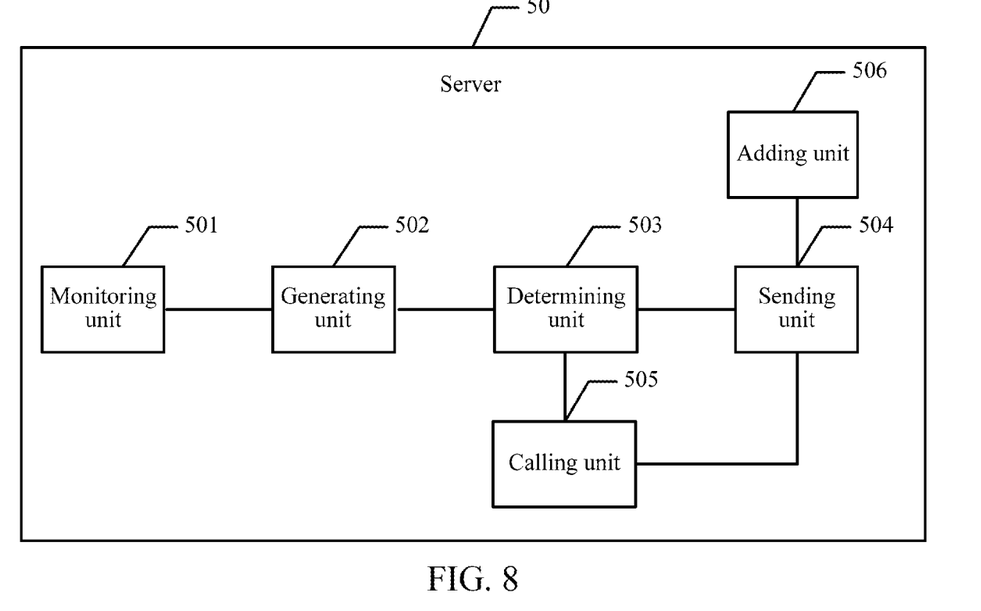
FIG. 8 is a schematic diagram of another embodiment of a server according to an embodiment of the present disclosure.

Optionally, based on the embodiment corresponding to FIG. 7, referring to FIG. 8, in a second optional embodiment of the server provided in the embodiments of the present disclosure, the server 50 further includes:

an adding unit 506, configured to add a sending record that indicates the audio data has already been sent to the user equipment in a data sending record after the sending unit 504 sends the audio data.

Optionally, the monitoring unit 501 is configured to:

monitor the calling by the interactive application to the audio interface by using Hook function of the audio interface; and determine the calling by the interactive application to the audio interface if a calling instruction of the interactive application to the audio interface is monitored to enter the Hook function of the audio interface.

Optionally, the calling unit 505 is configured to:

read the Hook function by using a magnetic disk to call the audio data corresponding to the audio instruction; and call the audio data corresponding to the audio instruction if a calling instruction of the interactive application to read the magnetic disk is monitored to enter the magnetic disk to read the Hook function.

Figure 9:
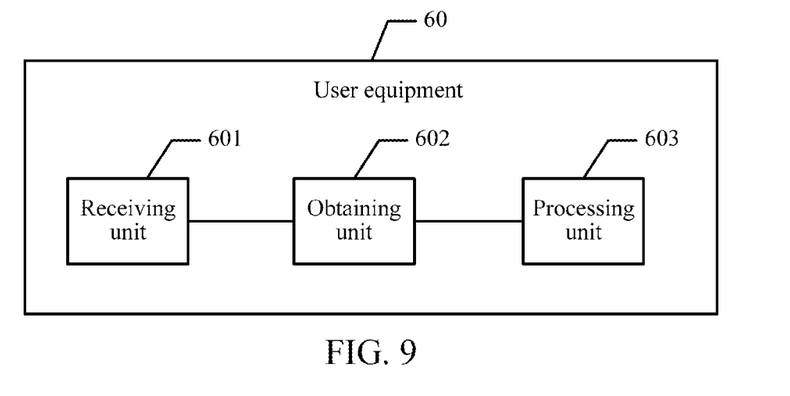
FIG. 9 is a schematic diagram of an embodiment of a user equipment according to an embodiment of the present disclosure.

Referring to FIG. 9, the user equipment 60 provided in the embodiments of the present disclosure is applied to a cloud interactive system. The cloud interactive system further includes a server. The user equipment 60 includes:

a receiving unit 601, configured to receive an audio instruction sent by the server;

an obtaining unit 602, configured to obtain audio data corresponding to the audio instruction received by the receiving unit 601 from a cache; and a processing unit 603, configured to use the cached audio data obtained by the obtaining unit 602 when executing the audio instruction.

In the related technology, a user equipment needs to play an audio clip sent by a server to implement playing an audio at a server end by the user equipment. Compared with that, the embodiments of the present disclosure provide a user equipment. The user equipment may play an audio according to the audio instruction, so as to improve the playing quality of the audio. In addition, audio data may be cached and the server does not need to repeatedly send same audio data, reducing network traffic from the server to the user equipment.

Optionally, based on the embodiment corresponding to FIG. 9, in a first optional embodiment of the user equipment provided in the embodiments of the present disclosure, the receiving unit 601 is further configured to receive the audio data corresponding to the audio instruction sent by the server, wherein the audio data is sent when the server determines that the audio data corresponding to the audio instruction does not have a sending record sent to the user equipment; and the processing unit 603 is further configured to store the audio data corresponding to the audio instruction in the cache.

Optionally, based on the corresponding embodiment or the first optional embodiment in FIG. 9, in a second optional embodiment of the user equipment provided in the embodiments of the present disclosure, the processing unit 603 is further configured to: when a data head of the audio data comprises a key value of an associated audio file of the audio data and an offset position and an offset length of the audio data in the audio file, determine the associated audio file according to the key value of the audio file, determine a storage position of the audio data in the associated audio file according to the offset position and the offset length, and cache the audio data in the associated audio file according to the storage position.

It is noted that the user equipment 60 includes other suitable components that are not shown, such as audio amplifier, a speaker, audio output components, and the like in certain embodiments.

Figure 10:
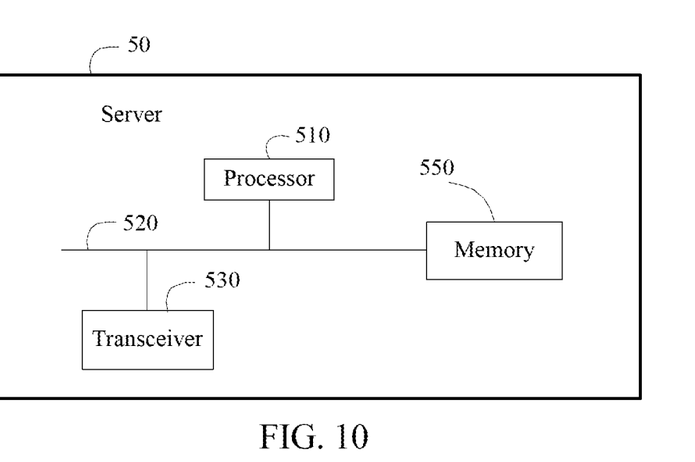
FIG. 10 is a schematic diagram of another embodiment of a server according to an embodiment of the present disclosure.

FIG. 10 is a schematic structural diagram of a server 50 according to an embodiment of the present disclosure. The server 50 is applied to a cloud interactive system. The cloud interactive system includes a user equipment and a server. The server 50 includes a processor 510, a memory 550, and a transceiver 530. The memory 550 may include a read-only memory and a random access memory and provides operating instructions and data to the processor 510. A part of the memory 550 may further include a non-volatile random access memory (NVRAM).

In some implementations, the memory 550 stores the following elements: executable modules or data structures, or a subset thereof, or an extension set thereof.

In the embodiments of the present disclosure, the processor 510 calls the operation instructions (the operation instructions may be stored in an operating system) stored in the memory 550.

The processor 510 is configured to monitor calling by an interactive application to an audio interface, generate, according to a type of the audio interface, an audio instruction corresponding to the type when the calling by the interactive application to the audio is monitored, and determine whether audio data corresponding to the audio instruction generated by the generating unit has a sending record sent to the user equipment.

The transceiver 530 is configured to send the audio instruction to the user equipment if the sending record exists, and the audio instruction being configured to use cached audio data when the user equipment executes the audio instruction.

In the related technology, a user equipment needs to play an audio clip sent by a server to implement playing an audio at a server end by the user equipment. Compared with that, the embodiments of the present disclosure provide a server. The server sends an audio instruction to the user equipment to implement playing the audio at the server end by the user equipment, so as to improve the playing quality of an audio at a user equipment end. In addition, the server merely sends the audio instruction to the user equipment when the server determines that audio data corresponding to the audio instruction to be sent has a sending record sent to a corresponding user equipment without repeatedly sending the audio data, reducing network traffic from the server to the user equipment.

The processor 510 controls an operation of the server 50. The processor 510 may further be referred to as a central processing unit (CPU). The memory 550 may include a read-only memory and a random access memory, and provides instructions and data to the processor 510. A part of the memory 550 may further include a non-volatile random access memory (NVRAM). In specific application, components of the server 50 are coupled together by using a bus system 520, where in addition to a data bus, the bus system 520 may include a power bus, a control bus, a status signal bus, and the like. However, for clear description, various types of buses in the figure are marked as the bus system 520.

The method disclosed in the foregoing embodiment of the present disclosure may be applied to the processor 510, or be implemented by the processor 510. The processor 510 may be an integrated circuit chip and has a signal processing capability. In an implementation process, each step of the foregoing method may be implemented by a hardware integrated logic circuit in the processor 510 or by an instruction in a software form. The foregoing processor 510 may be a general purpose processor, a digital signal processor (DSP), an application-specific integrated circuit (ASIC), a field programmable gate array (FPGA), or another programmable logical device, discrete gate or transistor logical device, or discrete hardware component. The processor 230 may implement or execute methods, steps and logical block diagrams disclosed in the embodiments of the present disclosure. The general purpose processor may be a microprocessor or the processor may be any conventional processor and the like. Steps of the methods disclosed with reference to the embodiments of the present disclosure may be directly executed and completed by means of a hardware decoding processor, or may be executed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory 550, and the processor 510 reads information in the memory 550 and completes the steps in the foregoing methods in combination with hardware of the processor.

Optionally, the processor 510 is further configured to call the audio data corresponding to the audio instruction if the sending record does not exist.

The transceiver 530 is further configured to sequentially send the audio data and the audio instruction to the user equipment.

Optionally, the processor 510 is further configured to add the sending record indicating that the audio data has already been sent to the user equipment in a data sending record.

Optionally, the processor 510 is configured to monitor the calling by the interactive application to the audio interface by using Hook function of the audio interface, and determine the calling by the interactive application to the audio interface if a calling instruction of the interactive application to the audio interface is monitored to enter the Hook function of the audio interface.

Optionally, the processor 510 is configured to read the Hook function by using a magnetic disk to call the audio data corresponding to the audio instruction, and call the audio data corresponding to the audio instruction if a calling instruction of the interactive application to read the magnetic disk is monitored to enter the magnetic disk to read the Hook function.

The foregoing server 50 may be understood with reference to related descriptions in FIG. 1 to FIG. 5, which is not described herein.

Figure 11:
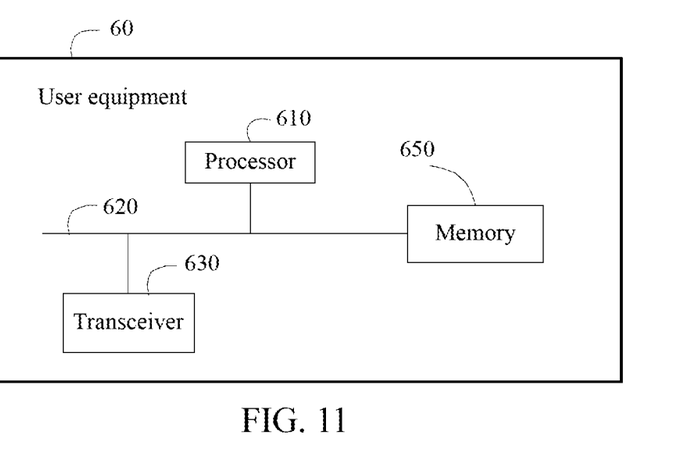
FIG. 11 is a schematic diagram of another embodiment of a user equipment according to an embodiment of the present disclosure.

FIG. 11 is a schematic structural diagram of a user equipment 60 according to an embodiment of the present disclosure. The user equipment 60 is applied to a cloud interactive system. The cloud interactive system includes a user equipment and a server. The user equipment 60 includes a processor 610, a memory 650, and a transceiver 630. The memory 650 may include a read-only memory and a random access memory and provides operating instructions and data to the processor 610. A part of the memory 650 may further include a non-volatile random access memory (NVRAM).

In some implementations, the memory 650 stores the following elements: executable modules or data structures, or a subset thereof, or an extension set thereof.

In the embodiments of the present disclosure, the processor 610 calls the operation instructions (the operation instructions may be stored in an operating system) stored in the memory 650.

The transceiver 630 is configured to receive an audio instruction sent by the server.

The processor 610 is configured to obtain audio data corresponding to the audio instruction from a cache and use the cached audio data to perform corresponding audio operations when executing the audio instruction.

In the related technology, a user equipment needs to play an audio clip sent by a server to implement playing an audio at a server end by the user equipment. Compared with that, the embodiments of the present disclosure provide a user equipment. The user equipment may play an audio according to the audio instruction, so as to improve the playing quality of the audio. In addition, audio data may be cached and the server does not need to repeatedly send same audio data, reducing network traffic from the server to the user equipment.

The processor 610 controls an operation of the user equipment 60. The processor 610 may further be referred to as a central processing unit (CPU). The memory 650 may include a read-only memory and a random access memory, and provides instructions and data to the processor 610. A part of the memory 650 may further include a non-volatile random access memory (NVRAM). In specific application, components of the user equipment 60 are coupled together by using a bus system 620, where in addition to a data bus, the bus system 620 may include a power bus, a control bus, a status signal bus, and the like. However, for clear description, various types of buses in the figure are marked as the bus system 620.

The method disclosed in the foregoing embodiment of the present disclosure may be applied to the processor 610, or be implemented by the processor 610. The processor 610 may be an integrated circuit chip and has a signal processing capability. In an implementation process, each step of the foregoing method may be implemented by a hardware integrated logic circuit in the processor 610 or by an instruction in a software form. The foregoing processor 610 may be a general purpose processor, a digital signal processor (DSP), an application-specific integrated circuit (ASIC), a field programmable gate array (FPGA), or another programmable logical device, discrete gate or transistor logical device, or discrete hardware component. The processor 230 may implement or execute methods, steps and logical block diagrams disclosed in the embodiments of the present disclosure. The general purpose processor may be a microprocessor or the processor may be any conventional processor and the like. Steps of the methods disclosed with reference to the embodiments of the present disclosure may be directly executed and completed by means of a hardware decoding processor, or may be executed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory 650, and the processor 610 reads information in the memory 650 and completes the steps in the foregoing methods in combination with hardware of the processor.

Optionally, the transceiver 630 is further configured to receive the audio data corresponding to the audio instruction sent by the server, where the audio data is sent when the server determines that the audio data corresponding to the audio instruction does not have a sending record sent to the user equipment; and.

The processor 610 is further configured to: when a data head of the audio data includes a key value of an associated audio file of the audio data and an offset position and an offset length of the audio data in the audio file, determine the associated audio file according to the key value of the audio file, determine a storage position of the audio data in the associated audio file according to the offset position and the offset length, and cache the audio data in the associated audio file according to the storage position.

The foregoing user equipment 60 may be understood with reference to related descriptions in FIG. 1 to FIG. 5, which is not described herein.

The embodiments of the present disclosure further provide a cloud interactive system. The cloud interactive system includes a user equipment and a server. The server is configured to: monitor calling by an interactive application to an audio interface, and generate, according to a type of the audio interface, an audio instruction corresponding to the type when the calling by the interactive application to the audio interface is monitored; determine whether audio data corresponding to the audio instruction has a sending record sent to the user equipment; and send the audio instruction to the user equipment if the sending record exists, where the audio instruction is configured to use cached audio data when the user equipment executes the audio instruction. The user equipment is configured to: receive an audio instruction sent by the server, obtain audio data corresponding to the audio instruction from a cache, and use the cached audio data when executing the audio instruction.

In the embodiment, for example, when the server determines that the audio data corresponding to the audio instruction does not have a sending record sent to the user equipment, the server is further configured to: call the audio data corresponding to the audio instruction, and sequentially send the audio data and the audio instruction to the user equipment. In this case, for example, the user equipment is further configured to: receive the audio data corresponding to the audio instruction sent by the server. For example, the user equipment may receive the audio data before receiving the audio instruction sent by the server, and the user equipment caches the audio data corresponding to the audio instruction. In view of this, the user equipment may continuously update the audio data being cached, so as to improve the playing quality of an audio and reduce network traffic from the server to the user equipment. The audio data may be in a compressed state.

In the foregoing embodiment, for example, when the server sends the audio data to the user equipment, the server may add the sending record indicating that the audio data has already been sent to the user equipment in a data sending record. In view of this, the server may conveniently determine whether the audio data is already sent to the user equipment, so as to avoid repeatedly sending same audio data and reducing the network traffic from the server to the user equipment.

In the foregoing embodiment, for example, a data head of the audio data sent to the user equipment by the server, for example, may include a key value of an associated audio file of the audio data and an offset position and an offset length of the audio data in the audio file. For example, the user equipment determines the associated audio file according to the key value of the audio file, determines a storage position of the audio data in the associated audio file according to the offset position and the offset length, and caches the audio data in the associated audio file according to the storage position. The audio data may be accurately cached by accurately determining the associated audio file of the audio data and a position of the audio data in associated audio file, so as to ensure the accuracy of audio playing.

The cloud interactive system provided in the embodiments of the present disclosure may be understood with reference to related descriptions in FIG. 1 to FIG. 5, which is not described herein.

A person of ordinary skill in the art may understand that all or some of the steps of the methods in the embodiments may be implemented by a program instructing relevant hardware. The program may be stored in a computer-readable storage medium. The storage medium may include: a ROM, a RAM, a magnetic disk, or an optical disc.

The audio processing method, the server, and the user equipment provided in the embodiments of the present disclosure are described in detail in the foregoing, and the text applies specific examples to describe the principle and implementation manners of the present disclosure. The foregoing descriptions of the embodiments are only intended to help understand the method and core idea of the present disclosure. Meanwhile, to persons of ordinary skill in the art, changes may be made on the specific implementation manners and application range according to the idea of the present disclosure. In conclusion, the content of the specification should not be construed as a limit to the present disclosure.

What is claimed is:

1. A method for audio processing, comprising:
    detecting, by a server device that interacts with user equipment in an interactive system, a first function call to a first audio interface from an interactive application;
    generating, by the server device, according to a type of the first audio interface, a first audio instruction corresponding to the type of the first audio interface when the first function call is detected;
    determining, by the server device, that a first record exists in a storage of the server device, the first record indicating that first audio data corresponding to the first audio instruction has been previously sent to the user equipment and is cached at the user equipment; and
    sending, by the server device in response to the determination that the first record exists, the first audio instruction without the first audio data to the user equipment, wherein the first audio instruction causes the user equipment to execute the first audio instruction using the first audio data cached at the user equipment.

2. The method according to claim 1, further comprising:
    detecting, by the server device, a second function call to a second audio interface from the interactive application;
    generating, by the server device, according to a type of the second audio interface, a second audio instruction corresponding to the type of the second audio interface when the second function call is detected;
    determining, by the server device, that a second record does not exist in the storage of the server device; and
    extracting from the storage, by the server device in response to the determination that the second record does not exist in the storage, second audio data corresponding to the second audio instruction; and
    sending the second audio data extracted from the storage and the second audio instruction to the user equipment, wherein the second audio instruction causes the user equipment to execute the second audio instruction using the second audio data.

3. The method according to claim 2, further comprising:
    adding, in a data sending record, the second record that the second audio data, extracted from the storage and corresponding to the second audio instruction, has been sent.

4. The method according to claim 1, wherein the detecting the first function call to the first audio interface from the interactive application comprises:
    using a Hook function to monitor the first function call to the first audio interface; and
    detecting the first function call to the first audio interface from the interactive application when a calling instruction of the interactive application to the first audio interface is detected by the Hook function.

5. The method according to claim 2, wherein the extracting from the storage the second audio data corresponding to the second audio instruction comprises:
    using a Hook function to monitor accesses to the storage for the second audio data corresponding to the second audio instruction;
    detecting, by the Hook function, a calling instruction to access the storage for the second audio data corresponding to the second audio instruction; and
    calling the second audio data corresponding to the second audio instruction.

6. A method for audio processing, comprising:
    receiving, by user equipment that interacts with a server device in an interactive system, an audio instruction sent by the server device, the audio instruction associated with a first function call to an audio interface from an interactive application;
    receiving, by the user equipment separately from the audio instruction, audio data associated with the audio instruction and sent by the server device when the audio data is not stored in a cache of the user equipment, the audio data associated with a second function call to the audio interface from the interactive application;
    storing, by the user equipment, the audio data associated with the audio instruction in the cache;

accessing the cache to obtain the audio data associated with the audio instruction; and executing, by the user equipment, the audio instruction to generate audio signals based on the audio data obtained from the cache.

7. The method according to claim 6, wherein the receiving, by the user equipment, the audio data that is sent by the server device further comprises:

receiving the audio data with a header that identifies the audio data.

8. The method according to claim 7, wherein the receiving the audio data with the header that identifies the audio data further comprises:

receiving the audio data with the header that is indicative of an audio file to which the audio data belongs and a position of the audio data in the audio file.

9. The method according to claim 8, wherein the receiving the audio data with the header that is indicative of the audio file to which the audio data belongs and the position of the audio data in the audio file further comprises:

receiving the audio data with the header that includes a key value for identifying the audio file to which the audio data belongs, an offset position of the audio data in the audio file and a length of the audio data.

10. The method according to claim 9, wherein the storing the audio data in the cache comprises:

determining, by the user equipment, the audio file according to the key value;

determining, by the user equipment, a storage position of the audio data according to the offset position and the length of the audio data; and caching, by the user equipment, the audio data according to the storage position.

11. An apparatus, comprising:

interface circuitry configured to receive an audio instruction that is sent by a server device, the audio instruction associated with a first function call to an audio interface from an interactive application;

the interface circuitry is configured to receive, separately from the audio instruction, audio data associated with the audio instruction and sent by the server device when the audio data is not stored in storage circuitry of the apparatus, the audio data associated with a second function call to the audio interface from the interactive application;

the storage circuitry configured to cache the audio data associated with the audio instruction; and processing circuitry configured to:

access the storage circuitry to obtain the audio data associated with the audio instruction, and execute the audio instruction to generate audio signals based on the audio data obtained from the storage circuitry.

12. The apparatus according to claim 11, wherein:

the interface circuitry is configured to receive the audio data with a header that identifies the audio data.

13. The apparatus according to claim 12, wherein:

the interface circuitry is configured to receive the audio data with the header that is indicative of an audio file to which the audio data belongs and a position of the audio data in the audio file.

14. The apparatus according to claim 13, wherein:

the interface circuitry is configured to receive the audio data with the header that includes a key value for identifying the audio file to which the audio data belongs, an offset position of the audio data in the audio file and a length of the audio data.

15. The apparatus according to claim 14, wherein:

the processing circuitry is configured to:

determine the audio file according to the key value;

determine a storage position of the audio data according to the offset position and the length of the audio data; and store the audio data in the storage circuitry according to the storage position.

* * * * *